US012754086B2

(12) United States Patent
Lee

(10) Patent No.: US 12,754,086 B2
(45) Date of Patent: Oct. 6, 2026

(54) TORQUE TEST DEVICE OF ELECTRIC ACTUATOR

(71) Applicant: KOREA AEROSPACE RESEARCH INSTITUTE, Daejeon (KR)

(72) Inventor: Jung Jin Lee, Sejong-si (KR)

(73) Assignee: KOREA AEROSPACE RESEARCH INSTITUTE, Daejeon (KR)

( * ) Notice: Subject to any disclaimer, the term of this patent is extended or adjusted under 35 U.S.C. 154(b) by 365 days.

(21) Appl. No.: 18/509,982

(22) Filed: Nov. 15, 2023

(65) Prior Publication Data

US 2024/0183729 A1 Jun. 6, 2024

(30) Foreign Application Priority Data

Dec. 6, 2022 (KR) ........................ 10-2022-0168462

(51) Int. Cl.
*G01L 3/10* (2006.01)

(52) U.S. Cl.
CPC ...................................... *G01L 3/10* (2013.01)

(58) Field of Classification Search
CPC ........................................................ G01L 3/10
USPC .................................................... 73/862.325
See application file for complete search history.

(56) References Cited

U.S. PATENT DOCUMENTS 4,706,507 A * 11/1987 D'Angelo ................. G01L 3/16 73/862.52
6,923,071 B2 * 8/2005 Landolt ..................... F16F 1/14 73/847

FOREIGN PATENT DOCUMENTS

KR 101811432 B1 12/2017

* cited by examiner

*Primary Examiner* — Walter L Lindsay, Jr.
*Assistant Examiner* — Warren K Fenwick
(74) *Attorney, Agent, or Firm* — McCoy Russell LLP

(57) ABSTRACT

The provided device is a torque testing tool for electric actuators, employing a potentiometer, load cell, and spring system to measure torque. It surpasses conventional leaf springs with its wider operational rotation range. The setup includes a potentiometer fixed at the electric actuator's shaft end, a vertically positioned torque arm, a rod connected to the torque arm with a load cell, and a spring system attached to the rod and a second bracket, all vertically aligned with the actuator's shaft. A control unit processes force data from the load cell and rotation angle data from the potentiometer to accurately calculate the electric actuator's torque. This innovative design ensures precise torque measurement, offering enhanced efficiency and versatility for various applications relying on electric actuators.

9 Claims, 9 Drawing Sheets

TORQUE TEST DEVICE OF ELECTRIC ACTUATOR

CROSS-REFERENCE TO RELATED APPLICATION

This application claims priority under 35 U.S.C. § 119 to Korean Patent Application No. 10-2022-0168462, filed on Dec. 6, 2022, in the Korean Intellectual Property Office, the disclosure of which is incorporated herein by reference in its entirety.

TECHNICAL FIELD

The following disclosure relates to a torque test device of an electric actuator, and more particularly, to a torque test device of an electric actuator that measures a torque generated by the electric actuator by using a potentiometer measuring a rotation angle, a load cell, and a spring system.

BACKGROUND

An electric actuator may be a system that transmits a torque by controlling a rotation angle by using a motor. FIG. 1 shows a torque test device using a leaf spring. Referring to FIG. 1, as a device measuring a torque of an electric actuator 1, the torque test device may use a torsion of a leaf spring 5. The torque test device may measure the torque by fixing one side of the leaf spring and rotating a shaft of the actuator.

However, a conventional torque measurement method may only conduct a test up to an allowable torsion angle of the leaf spring. The torque test device may measure the torque at a certain rotation angle when a torsional rigidity of the leaf spring is small. However, a nonlinear behavior may occur when the torsion angle is large to produce data different from actual data.

When the torsional rigidity is large, a torque error may be ignored because there is no nonlinear behavior. However, in this case, the leaf spring may have a limited operational rotation range, and when the leaf spring even slightly exceeds this operational range, an overtorque may occur to cause an overcurrent in the electric actuator. In addition, the electric actuator may require an adapter and an axis of a torque sensor that are precisely aligned with each other.

That is, there is a need for a torque test device which may solve the problems that the torque test device of the conventional electric actuator has the limited range of the allowable torsion angle due to the use of the leaf spring, and the shaft of the electric actuator, the adapter, and the axis of the torque sensor are required to be precisely aligned with one another before the test.

SUMMARY

An embodiment of the present disclosure is directed to providing a torque test device of an electric actuator that is designed to solve a problem that a range of a torsion angle is limited by using a conventional leaf spring, and capable of conducting a test at a torsion angle of 90 degrees or more.

Another embodiment of the present disclosure is directed to providing a torque test device of an electric actuator that has a torque arm disposed on a shaft of the actuator without using a torque sensor or an adapter to solve a problem that a shaft of the actuator, the adapter, and an axis of the torque sensor are required to be precisely aligned with one another before conducting a test.

In one general aspect, provided is a torque test device of an electric actuator, the device including: a potentiometer having one end fixed by a first bracket, and disposed at an end of a shaft of the electric actuator; a torque arm of the electric actuator that is disposed vertically to the shaft of the electric actuator; a rod coupled to the torque arm of the electric actuator, and installed with a load cell; a spring system having one end coupled to the rod and the other end coupled to a second bracket, and disposed vertically to the shaft of the electric actuator; and a control unit calculating a torque of the electric actuator by receiving force data measured by the load cell and a rotation angle measured by the potentiometer.

The spring system may include two support plates spaced apart from each other, a plurality of supports each having an end disposed vertically to each support plate, a central shaft disposed vertically to a center of one support plate, a moving part passing through the other support plate, having a groove into which the central shaft is inserted, and including an end coupled to the support, a first spring disposed on an outer surface of the moving part and in contact with the other support plate, and a second spring disposed on an outer surface of the central shaft and in contact with one support plate.

The device may include a first joint hinge-coupling the torque arm of the electric actuator with the rod, and a second joint hinge-coupling the spring system with the second bracket.

The control unit may receive the rotation angle from the potentiometer and the force from the load cell to derive an inclination of the rod by [Equation 2] below, and derive the torque of the electric actuator by [Equation 4] below:

$$\alpha = \tan^{-1}\left(\frac{R(1-\cos\theta)}{L+\Delta}\right), \text{ and} \quad \text{[Equation 2]}$$

$$T = FR\cos(\theta-\alpha), \quad \text{[Equation 4]}$$

here, ΔL indicates displacement of the spring system, R indicates a length of the torque arm of the electric actuator, θ indicates the rotation angle measured by the potentiometer, α indicates the inclination of the rod, and L indicates a length including the rod and the spring system.

The control unit may receive the derived torque and derive each elastic modulus of the first and second springs coupled to the spring system by [Equation 8] below:

$$k = \frac{T}{RS}\cos\alpha, \quad \text{[Equation 8]}$$

here, R indicates the length of the torque arm of the electric actuator, θ indicates the rotation angle measured by the potentiometer, a indicates the inclination of the rod, L indicates a length of the rod, S indicates displacement of the spring, and k indicates a spring coefficient.

The device may further include a displacement sensor disposed on the second bracket and measuring displacement of the moving part.

The control unit may receive the rotation angle from the potentiometer, the force from the load cell, and the displacement of the moving part from the displacement sensor to derive an inclination of the rod by [Equation 3] below, and derive the torque of the electric actuator by [Equation 4] below:

$$\alpha = \sin^{-1}\left(\frac{L + \Delta L}{R(1 - \cos\theta)}\right), \text{ and} \quad \text{[Equation 3]}$$

$$T = FR\cos(\theta - \alpha), \quad \text{[Equation 4]}$$

here, ΔL indicates displacement of the spring system, R indicates a length of the torque arm of the electric actuator, θ indicates the rotation angle measured by the potentiometer, α indicates the inclination of the rod, and L indicates a length including the rod and the spring system.

The control unit may receive the derived torque to derive each elastic modulus of the first and second springs by [Equation 8] below:

$$k = \frac{T}{R\,S}\cos\alpha, \quad \text{[Equation 8]}$$

here, R indicates the length of the torque arm of the electric actuator, θ indicates the rotation angle measured by the potentiometer, α indicates the inclination of the rod, L indicates a length of the rod, S indicates displacement of the spring, and k indicates a spring coefficient.

The first spring may be compressed by a pressure of the moving part, and the second spring may be spaced apart from the moving part.

In another general aspect, provided is a torque test device of an electric actuator, the device including: a potentiometer having one end fixed by a first bracket, and disposed at an end of a shaft of the electric actuator; a torque arm of the electric actuator that is disposed vertically to the shaft of the electric actuator; a rod coupled to the torque arm of the electric actuator, and installed with a load cell; a spring system having one end coupled to a third bracket and the other end coupled to a second bracket, and disposed vertically to the shaft of the electric actuator; and a control unit calculating a torque of the electric actuator by receiving force data measured by the load cell and a rotation angle measured by the potentiometer.

The device may include a first joint hinge-coupling the torque arm of the electric actuator with the rod, and a second joint hinge-coupling the spring system with the second bracket.

The device may further include a displacement sensor disposed on the third bracket and measuring displacement of the spring system.

The control unit may receive the rotation angle from the potentiometer and the force from the load cell to derive an inclination of the rod by [Equation 5] below, and derive the torque of the electric actuator by [Equation 6] below:

$$\alpha = \sin^{-1}\left(\frac{R}{L}\sin\theta\right), \text{ and} \quad \text{[Equation 5]}$$

$$T = FR\sin(\theta + \alpha), \quad \text{[Equation 6]}$$

here, ΔL indicates displacement of the spring system, R indicates a length of the torque arm of the electric actuator, θ indicates the rotation angle measured by the potentiometer, α indicates the inclination of the rod, and L indicates a length including the rod and the spring system.

In still another general aspect, provided is a torque test device of an electric actuator, the device including: a potentiometer having one end fixed by a first bracket, and disposed at an end of a shaft of the electric actuator; a torque arm of the electric actuator that is disposed vertically to the shaft of the electric actuator; a linkage coupled to the torque arm of the electric actuator, and including a plurality of links coupled thereto; a rod coupled to the linkage, and installed with a load cell; a spring system having one end coupled to the rod and the other end coupled to a second bracket, and disposed vertically to the shaft of the electric actuator; and a control unit calculating a torque of the electric actuator and rigidity of the designed linkage by receiving displacement of the spring system and a force measured by the load cell.

DETAILED DESCRIPTION OF EMBODIMENTS

Figure 1:
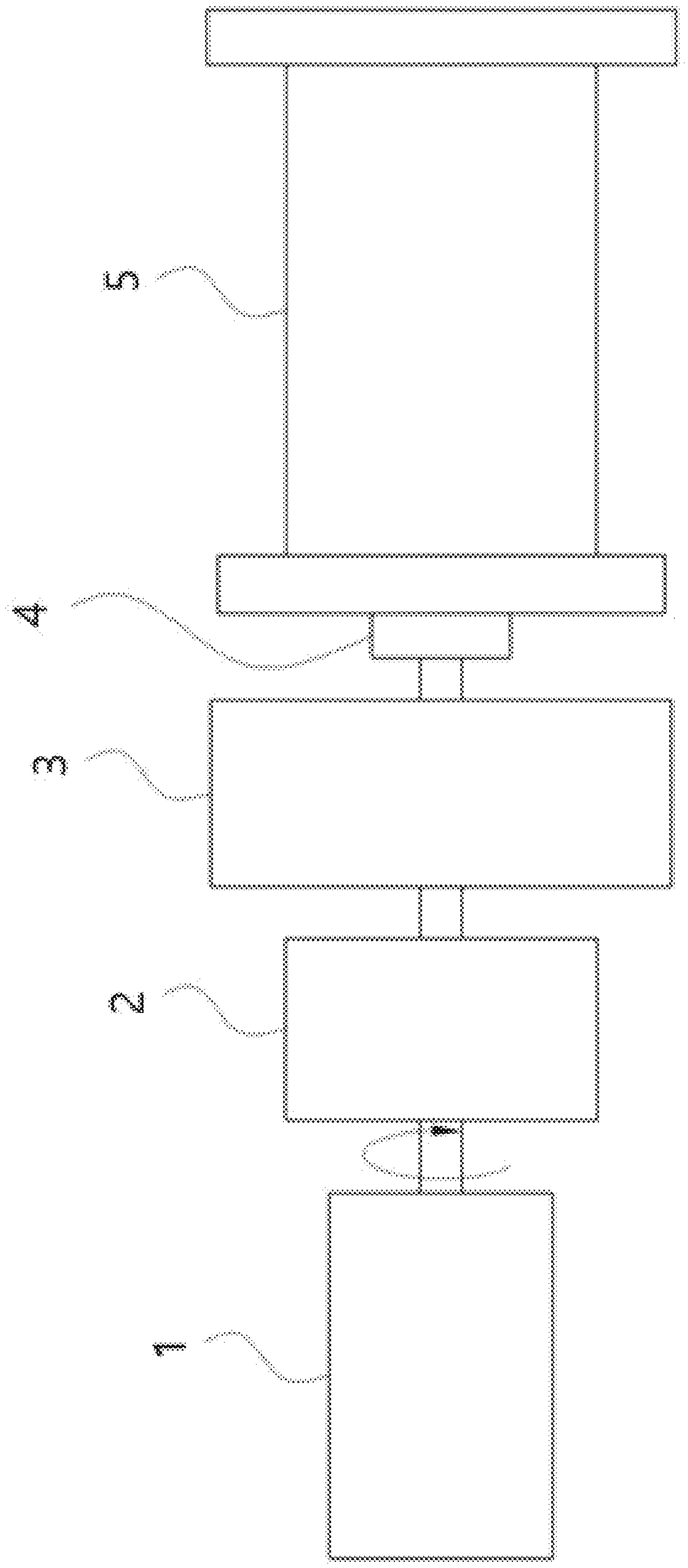
FIG. 1 Prior Art
FIG. 1 shows a conventional torque test device.

The present disclosure may be variously modified and have various embodiments, and specific embodiments are shown in the drawings and described in detail in the detailed description. However, it is to be understood that the present disclosure is not limited to the specific embodiments, and includes all modifications included in the spirit and scope of the present disclosure.

Unless defined otherwise, it is to be understood that all terms used in the specification including technical and scientific terms have the same meanings as those that are generally understood by those skilled in the art to which the present disclosure pertains.

It should be interpreted that terms defined by a generally used dictionary have the same meanings as the meanings in the context of the related art, and these terms should not be ideally or excessively formally interpreted unless explicitly defined in this application.

Hereinafter, the description describes a torque test device of an electric actuator 100 according to the embodiment of the present disclosure in detail with reference to the accompanying drawings.

Figure 2:
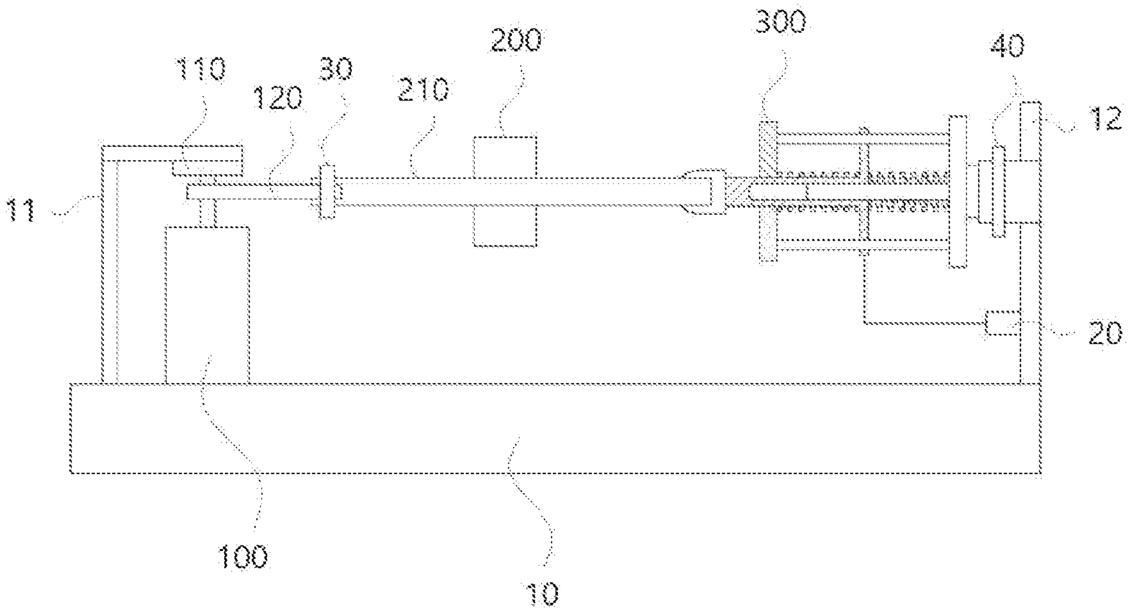
FIG. 2 is a view showing a configuration of a torque test device according to the present disclosure.

FIG. 2 is a view showing a configuration of a torque test device according to the present disclosure. Referring to FIG. 2, the torque test device includes: a potentiometer 110 having one end fixed by a first bracket 11 and disposed at an end of a shaft of the electric actuator 100; a torque arm 120 of the electric actuator that is disposed vertically to the shaft of the electric actuator 100; a rod 210 coupled to the torque arm of the electric actuator, and installed with a load cell 200; a spring system 300 having one end coupled to the rod 210 and the other end coupled to a second bracket 12, and disposed vertically to the shaft of the electric actuator 100; and a control unit 400 calculating a torque of the electric actuator 100 by receiving force data measured by the load cell 200 and a rotation angle measured by the potentiometer 110.

The first bracket 11, the electric actuator 100, and the second bracket 12 may be disposed vertically to an upper surface of a frame 10. Here, the first bracket 11 may include a bent part at its upper end, and may be disposed on an upper side of the electric actuator 100. The bent part may be disposed vertically to the shaft of the electric actuator 100 and disposed to be in contact with the potentiometer 110.

The potentiometer 110 may have one surface fixed to the first bracket 11 and the other surface coupled to the shaft of the electric actuator 100. The potentiometer 110 may be rotated at a certain angle by a force of the electric actuator 100, and a rotation angle of the electric actuator 100 may be known by a resistance or a voltage that is changed due to the potentiometer 110.

The torque arm of the electric actuator 120 may be disposed vertically to the shaft of the electric actuator 100. In a conventional torque test device, the torque arm of the electric actuator 120 may be disposed to match the shaft of the electric actuator 100. However, the present disclosure may include the torque arm of the electric actuator 120 disposed vertically to the shaft of the electric actuator 100, thus having no need to have any difficulty in aligning its components.

The rod 210 may have one end coupled with the torque arm 120 of the electric actuator and the other end coupled with the spring system 300. The rod 210 may include the load cell 200 to measure the force generated by the electric actuator 100. Here, a type of the load cell 200 is not limited.

The spring system 300 may be supported by the rod 210 and the second bracket 12, and disposed horizontally to the frame 10 disposed on the bottom. The spring system 300 may have a plurality of springs disposed therein while having a shape of a general spring rather than a conventional leaf spring.

The rod 210 and the torque arm 120 of the electric actuator may be hinge-coupled with each other by a first joint 30, and the spring system 300 and the second bracket 12 may be hinge-coupled with each other by a second joint 40. When the electric actuator 100 is rotated, the electric actuator 100 may be rotated through a hinge-coupling structure of the first joint 30 and the second joint 40. Here, displacement of the spring system 300 may occur by the rotation of the electric actuator 100.

As the electric actuator 100 is moved in left and right directions, the rod 210 may be moved in front and back directions, and the spring system 300 coupled to the rod 210 may be expanded and contracted in the front and back directions through the spring.

Here, the spring system 300 may include the plurality of springs, and some of the springs may be compressed when the rod 210 is moved in the front or back direction. That is, the force for the displacement may be measured because the spring is compressed regardless of the direction. The second bracket 12 may be installed with a displacement sensor 20 measuring the displacement of the spring system 300 by the electric actuator 100.

The control unit 400 may calculate the torque generated by the electric actuator 100. In detail, the control unit 400 may calculate the torque of the electric actuator 100 by receiving rotation angle data from the potentiometer 110, the force data from the load cell 200, and displacement data of the spring system 300 from the displacement sensor 20. Here, an elastic modulus of the spring disposed in the spring system 300 may be an already-known constant.

Figure 3:
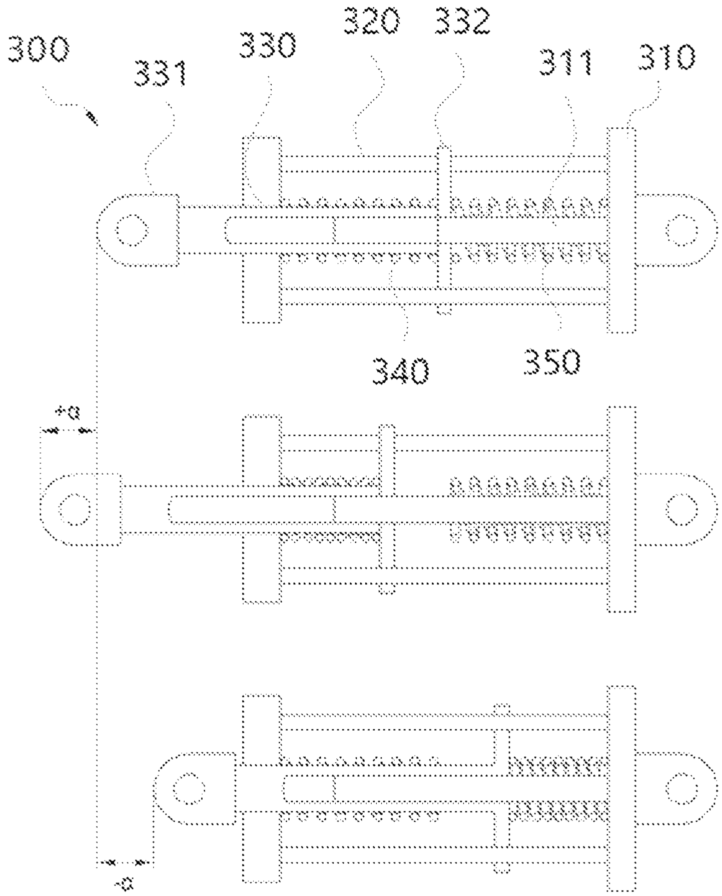
FIG. 3 is a detailed view of a spring system.

FIG. 3 is a detailed view of the spring system 300. Referring to FIG. 3, the spring system 300 may include two support plates 310 spaced apart from each other in a length direction and disposed for their wide surfaces to oppose each other, a plurality of supports 320 each having an end disposed vertically to each support plate 310, a central shaft 311 disposed vertically to the center of one support plate 310, a moving part 330 passing through the other support plate 310, having a groove into which the central shaft 311 is inserted, and including a moving plate 332 coupled to the support 320, a first spring 340 disposed on an outer surface of the moving part 330 and in contact with the other support plate 310, and a second spring 350 disposed on an outer surface of the central shaft 311 and in contact one support plate 310.

The support plates 310 may be spaced apart from each other in the length direction, and disposed to oppose each other. The support plate 310 may be installed with the plurality of supports 320. A housing of the spring system 300 may be formed by coupling the support plate 310 and the support 320 with each other.

The central shaft 311 may be disposed vertically to the center of one support plate 310. The central shaft 311 may be provided to limit movement of the moving part 330 and simultaneously dispose the second spring 350 thereon.

The moving part 330 may be coupled with the support 320 and moved in the length direction. In more detail, a tap, which is coupled to the moving plate 332 coupled to the support 320 to allow its end to pass through the center of the other support plate 310, and coupled to the rod 210, may be disposed on one end of the moving part 330. The moving part 330 may have the groove which is formed in the center and into which the central shaft 311 is inserted.

The first spring 340 may be disposed between the support plate 310 and the moving plate 332, and supported by the moving part 330. The second spring 350 may be disposed between the support plate 310 and the moving plate 332, and disposed to be supported by the central shaft 311. In this way, the first spring 340 may be compressed when the moving part 330 is moved in the front direction, and the second spring 350 may be compressed when the moving part 330 is moved in the back direction.

Here, the first spring 340 and second spring 350 may be disposed to be in contact with the moving plate 332. That is, the second spring 350 may have no effect when the first spring 340 is compressed. In addition, the first spring 340 may have no effect when the second spring 350 is compressed.

The control unit 400 may receive each elastic modulus of the first and second springs 340 and 350 to derive the elastic modulus of the spring when receiving no elastic modulus. The present disclosure may change a torque measurement range by changing the elastic modulus of the spring when the electric actuator has a large torque. A method of deriving the elastic modulus of the spring is described below. Here, the displacement sensor 20 may measure the displacement based on a position of the moving plate 332.

A tab 331 may be disposed at the end of the moving part 330 to connect the rod 210 with the spring system 300. Here, the rod 210 and the spring system 300 may be coupled with each other by various members, and an embodiment shown in FIG. 2 is not rotated by the coupling of the tab 331.

Figure 4:
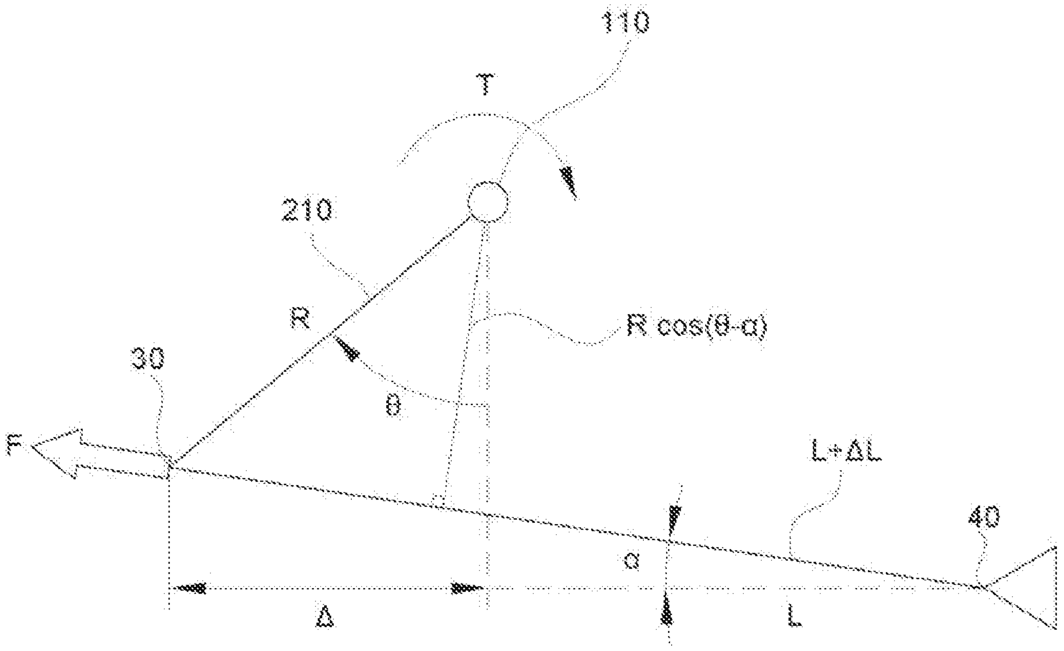
FIGS. 4 and 5 are structural views of movement of an actuator.
Figure 5:
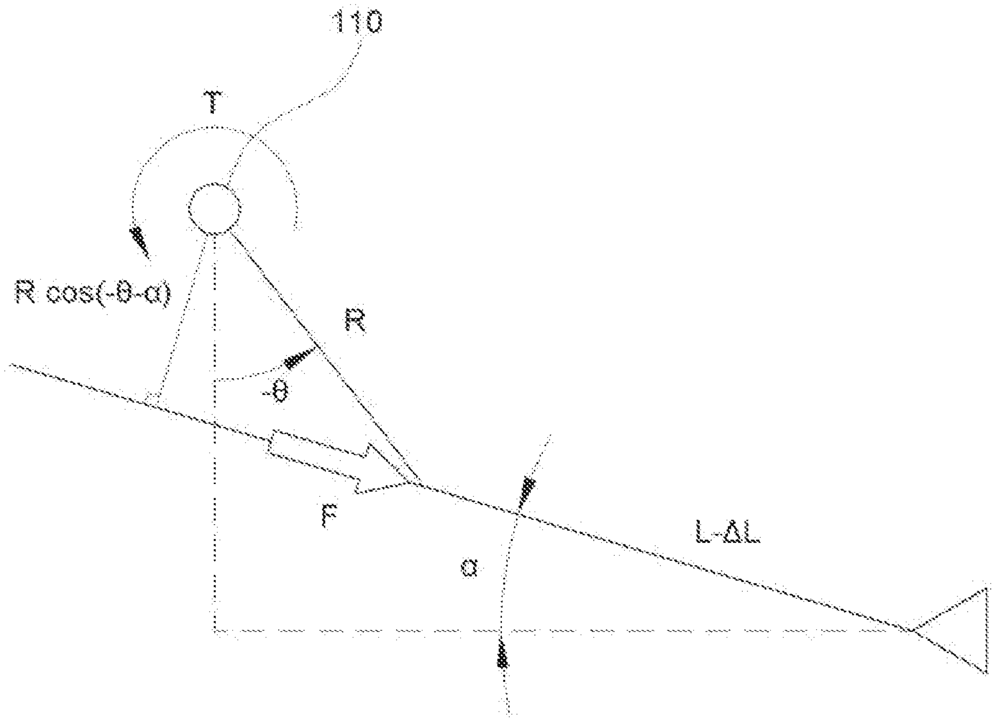

FIGS. 4 and 5 are structural views of the movement of the actuator. The description describes in detail the movement and torque measurement principle of the present disclosure in detail with reference to FIGS. 4 and 5. FIG. 4 shows an example of the force generated clockwise by the electric actuator 100 while the torque arm 120 of the electric actuator and the rod 210 are disposed vertically to each other; and FIG. 5 shows an example of the force generated counterclockwise by the electric actuator 100. A torque calculation principle of the electric actuator 100 is the same regardless of a rotation direction of the electric actuator 100. Accordingly, the description is provided based on FIG. 4.

The potentiometer 110 may have a certain rotation angle by the force of the electric actuator 100, and the first joint 30 and the second joint 40 may be rotated to form a certain inclination a by rotating the torque arm 120 of the electric actuator. Here, displacement A of the spring system 300 may occur due to the force of the electric actuator 100. The displacement may be calculated by [Equation 1]:

$$\triangle = R \sin\theta \quad \text{[Equation 1]}$$

A torque T may be affected by a force F and a radius R, and directions of the force and the radius are required to be vertical to each other. The force F may be measured using the load cell 200, and the torque may be calculated based on a vertical distance between the potentiometer 110 and the rod 210. The vertical distance may be calculated using a trigonometric function between the components.

Therefore, the torque may be calculated using an equation below.

When there is no displacement sensor 20, an inclination of the rod 210 based on displacement of the spring may be expressed by [Equation 2]:

$$\alpha = \tan^{-1}\left(\frac{R(1-\cos\theta)}{L+\Delta}\right). \quad \text{[Equation}$$

When there is the displacement sensor 20, the inclination of the rod 210 may be expressed by [Equation 3]:

$$\alpha = \sin^{-1}\left(\frac{L+\Delta L}{R(1-\cos\theta)}\right). \quad \text{[Equation 3]}$$

Therefore, the torque of the actuator may be expressed by [Equation 4] with respect to the rotation angle measured by the potentiometer 110, regardless of its direction.

$$T = FR\cos(\theta-\alpha). \quad \text{[Equation 4]}$$

Here, ΔL indicates the displacement of the spring system, R indicates a length of the torque arm of the electric actuator, θ indicates the rotation angle measured by the potentiometer, α indicates the inclination of the rod, and L indicates a length including the rod and the spring system.

Figure 6:
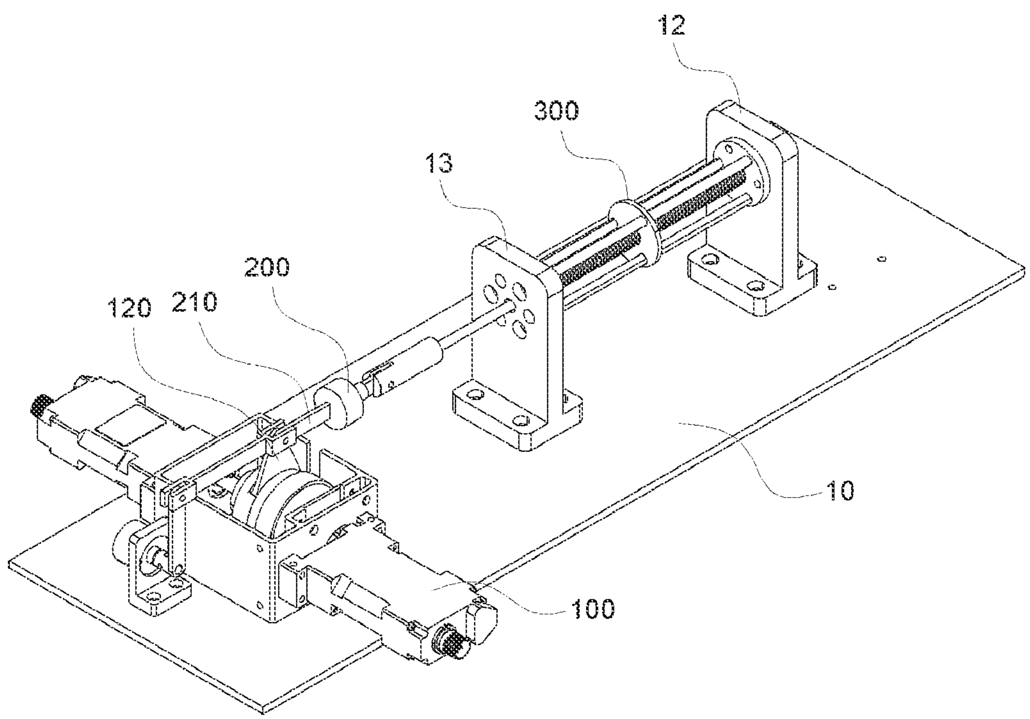
FIG. 6 is a perspective view of another embodiment of the present disclosure.

FIG. 6 is a perspective view of another embodiment of the present disclosure. Referring to FIG. 6, the second bracket 12 and a third bracket 13 may be disposed vertically to the upper surface of the frame 10, and the spring system 300 may be disposed between the second bracket and the third bracket. In addition, the electric actuator 100 may be disposed on the upper surface of the frame 10, and the electric actuator and the spring system may be connected with each other by the torque arm 120 of the electric actuator and the rod 210. The load cell 200 may be disposed on the rod 210 to measure the force generated by the electric actuator 100.

In addition, the torque arm 120 of the electric actuator may be connected to an articulated link 50 to thus be connected to another component.

The spring system may be move in the front and back directions by an operation of the electric actuator, and the force of the electric actuator may be measured using the load cell disposed between the electric actuator and the spring system.

A detailed description of another embodiment is provided below.

Figure 7:
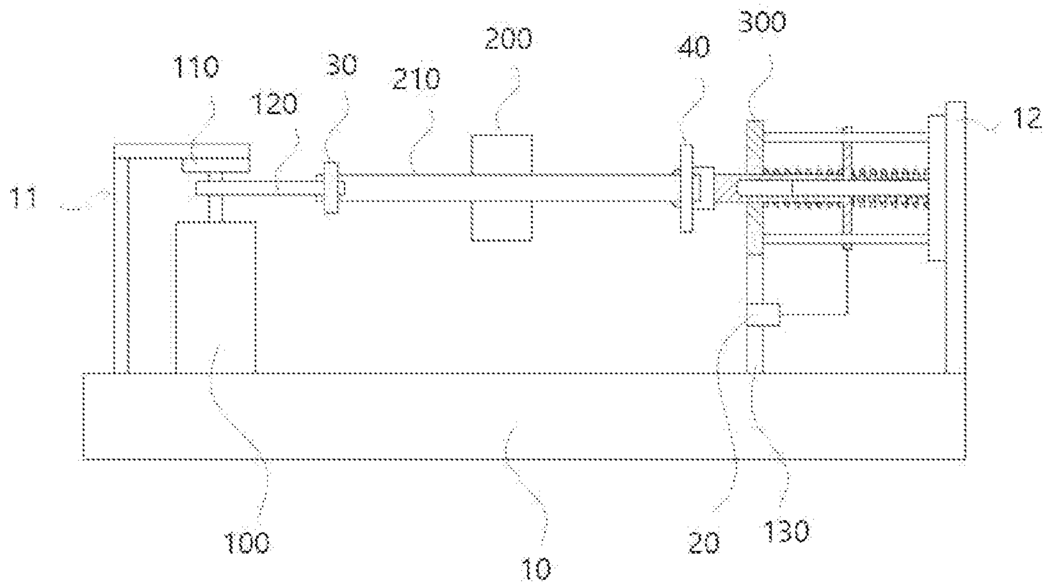
FIG. 7 is a front view of another embodiment.

FIG. 7 is a front view of another embodiment. Referring to FIG. 7, this embodiment shows that a position of the second joint 40 is changed. The electric actuator 100 may be operated by receiving a signal from the control unit 400, and include the potentiometer 110 measuring the rotation angle of the electric actuator 100, the torque arm 120 of the electric actuator that is rotated by the electric actuator 100, the torque arm 120 of the electric actuator that is coupled with the rod 210, and the spring system 300 coupled with the rod 210.

The torque arm 120 of the electric actuator and rod 210 may be coupled with each other to be rotatable by the first joint 30, and the rod 210 and the spring system 300 may be coupled with each other to be rotatable by the second joint 40. Here, the support plate 310 of the spring system 300 may be fixed to each of the second bracket 12 and the third bracket 13. That is, a position of the spring system 300 may be fixed, and only the spring and the moving part 330 may be moved.

The displacement sensor 20 may be disposed on the second bracket 12 or the third bracket 13 and measure displacement of the moving part 330. In another embodiment of FIG. 6, the spring system 300 may be disposed horizontally and supported by the third bracket 13 to have high stability.

Figure 8:
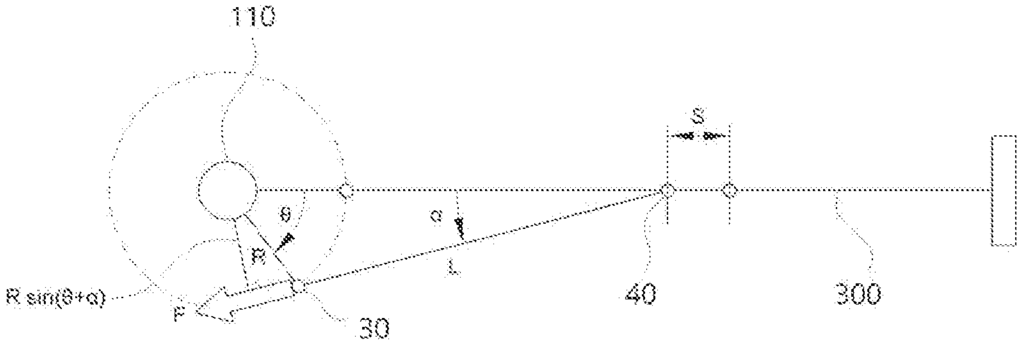
FIG. 8 is a structural view of movement of an actuator in another embodiment.

FIG. 8 is a structural view of the movement of the actuator in another embodiment. The description describes that the torque of the electric actuator 100 is calculated when the spring system 300 is fixed as in FIG. 6. In addition, referring to FIG. 8, an initial state is a state where the torque arm 120 of the electric actuator, the rod 210, and the spring system 300 are aligned horizontally with one another, and the description describes the calculation on the torque of the electric actuator 100 when the potentiometer 110 has the rotation angle due to the force of the electric actuator 100.

The torque arm 120 of the electric actuator and the rod 210 may be moved due to the force of the electric actuator 100, thus causing the displacement of the spring. In addition, the inclination of the rod 210 may be formed by the rotation angle.

As described above with reference to FIGS. 4 and 5, the calculation on the torque of the electric actuator 100 may be derived from a structure in which the torque arm 120 of the electric actuator and the measured force are vertical to each other.

The inclination a of the rod 210 based on displacement S of the spring may be expressed by [Equation 5]:

$$\alpha = \sin^{-1}\left(\frac{R}{L}\sin\theta\right). \quad \text{[Equation 5]}$$

The torque of the electric actuator 100 may be expressed by [Equation 6] with respect to the rotation angle measured by the potentiometer 110.

$$T = FR\sin(\theta+\alpha). \quad \text{[Equation 6]}$$

In addition, the displacement S of the spring may be expressed by [Equation 7]:

$$S=R(1-\cos\theta)+L(1-\cos\alpha). \quad \text{[Equation 7]}$$

A spring coefficient k, corresponding to the displacement of the spring and a rated torque of the electric actuator, may be acquired from [Equation 8]:

$$k=\frac{T}{R\,S}\cos\alpha. \quad \text{[Equation 8]}$$

Here, R indicates the length of the torque arm of the electric actuator, θ indicates the rotation angle measured by the potentiometer, α indicates the inclination of the rod, L indicates a length of the rod, S indicates the displacement of the spring, and k indicates the spring coefficient.

In this way, the torque of the electric actuator 100 may be calculated.

Figure 9:
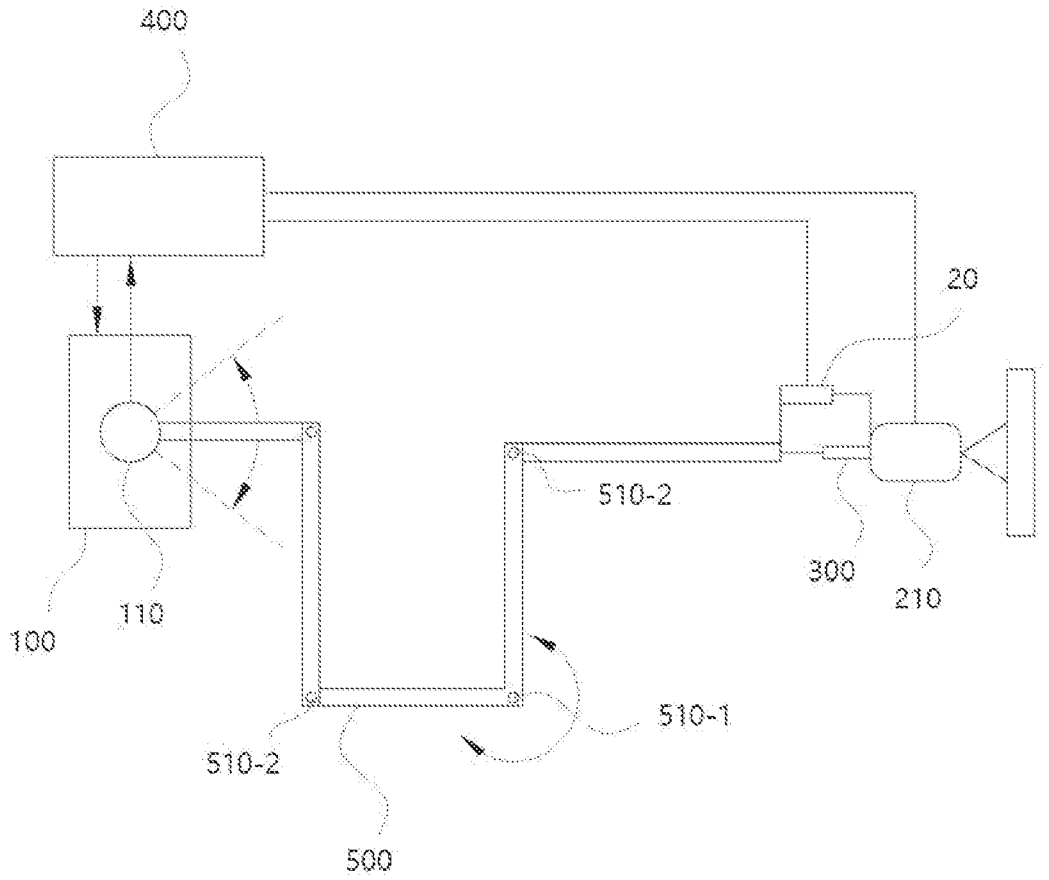
FIG. 9 is an exemplary view of a linkage test.

FIG. 9 is an exemplary view of application of a linkage test. Referring to FIG. 9, a linkage 500 including a plurality of links coupled with each other may be coupled between the torque arm 120 of the electric actuator and the rod 210 to conduct a rigidity test. The rigidity test may be conducted by having a plurality of fixed coupling parts 510-2 and rotating one coupling part 510-1.

The control unit 400 may transmit an operation signal to the electric actuator 100, thus rotating the torque arm 120 of the electric actuator, and the control unit 400 may receive the rotation angle measured by the potentiometer 110. A structure of the linkage 500 and the rod 210 may be moved, and the spring of the spring system 300 may be moved, by movement of the torque arm 120 of the electric actuator.

The control unit 400 may calculate the torque of the electric actuator 100 and evaluate rigidity of the designed structure of the linkage 500 by receiving the displacement of the spring system 300 and the force measured by the load cell 200.

Here, the load cell 200 may be disposed on a rear surface of the rod 210 or that of the spring system 300.

In addition, it is possible to adjust the displacement based on the elastic modulus of the spring, thus conducting a stall test of the maximum rated torque test of the actuator or more. The stall test is a test to check maintenance of clutch and brake performance, and may be applied to test slippage of a clutch of a torque converter with a power transmission function, a driving force of an engine, or the like.

As set forth above, the present disclosure may have the wider operational rotation range than the conventional leaf spring by using the compression spring.

In addition, the present disclosure may use the two compression springs to thus simultaneously receive the tension and the compression, thereby conducting the test in the left and right directions.

In addition, the present disclosure may adjust the displacement based on the elastic modulus of the spring, thus conducting the stall test of the maximum rated torque test of the actuator or more.

In addition, the present disclosure may have the torque arm disposed vertically to the shaft of the electric actuator, with no need for the precise alignment between the components.

The present disclosure is not limited to the above-described embodiments, may be variously applied, and may be variously modified without departing from the gist of the present disclosure claimed in the appended claims.

What is claimed is:

1. A torque test device of an electric actuator, the device comprising:

a potentiometer having one end fixed by a first bracket, and disposed at an end of a shaft of the electric actuator;

a torque arm of the electric actuator that is disposed vertically to the shaft of the electric actuator;

a rod coupled to the torque arm of the electric actuator, and installed with a load cell;

a spring system having one end coupled to the rod and the other end coupled to a second bracket, and disposed vertically to the shaft of the electric actuator; and a control unit calculating a torque of the electric actuator by receiving force data measured by the load cell and a rotation angle measured by the potentiometer.

2. The device of claim 1, wherein the spring system includes two support plates spaced apart from each other, a plurality of supports each having an end disposed vertically to each support plate, a central shaft disposed vertically to a center of one support plate, a moving part passing through the other support plate, having a groove into which the central shaft is inserted, and including an end coupled to the support, a first spring disposed on an outer surface of the moving part and in contact with the other support plate, and a second spring disposed on an outer surface of the central shaft and in contact with one support plate.

3. The device of claim 2, further comprising a displacement sensor disposed on the second bracket and measuring displacement of the moving part.

4. The device of claim 2, wherein the first spring is compressed by a pressure of the moving part, and the second spring is spaced apart from the moving part.

5. The device of claim 1, wherein the device includes a first joint hinge-coupling the torque arm of the electric actuator with the rod, and a second joint hinge-coupling the spring system with the second bracket.

6. A torque test device of an electric actuator, the device comprising:

a potentiometer having one end fixed by a first bracket, and disposed at an end of a shaft of the electric actuator;

a torque arm of the electric actuator that is disposed vertically to the shaft of the electric actuator;

a rod coupled to the torque arm of the electric actuator, and installed with a load cell;

a spring system having one end coupled to a third bracket and the other end coupled to a second bracket, and disposed vertically to the shaft of the electric actuator; and a control unit calculating a torque of the electric actuator by receiving force data measured by the load cell and a rotation angle measured by the potentiometer.

7. The device of claim 6, wherein the device includes a first joint hinge-coupling the torque arm of the electric actuator with the rod, and a second joint hinge-coupling the spring system with the second bracket.

8. The device of claim 6, further comprising a displacement sensor disposed on the third bracket and measuring displacement of the spring system.

9. A torque test device of an electric actuator, the device comprising:

a potentiometer having one end fixed by a first bracket, and disposed at an end of a shaft of the electric actuator;

a torque arm of the electric actuator that is disposed vertically to the shaft of the electric actuator;

a linkage coupled to the torque arm of the electric actuator, and including a plurality of links coupled thereto;

a rod coupled to the linkage, and installed with a load cell;

a spring system having one end coupled to the rod and the other end coupled to a second bracket, and disposed vertically to the shaft of the electric actuator; and a control unit calculating a torque of the electric actuator and rigidity of the designed linkage by receiving displacement of the spring system and a force measured by the load cell.

* * * * *